United States Patent
Provenza

(10) Patent No.: US 10,935,351 B2
(45) Date of Patent: Mar. 2, 2021

(54) SELECTABLE FORCE GAS GENERATOR

(71) Applicant: US Govt as represented by Secretary of Air Force, Wright-Patterson AFB, OH (US)

(72) Inventor: Jerry Provenza, Niceville, FL (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 0 days.

(21) Appl. No.: 16/744,297

(22) Filed: Jan. 16, 2020

(65) Prior Publication Data

US 2020/0200511 A1    Jun. 25, 2020

Related U.S. Application Data

(63) Continuation-in-part of application No. 16/190,740, filed on Nov. 14, 2018, now Pat. No. 10,710,721.

(60) Provisional application No. 62/892,912, filed on Aug. 28, 2019.

(51) Int. Cl.
| | |
|---|---|
| *F42B 3/04* | (2006.01) |
| *F42B 3/10* | (2006.01) |
| *B64D 1/02* | (2006.01) |
| *F42C 19/12* | (2006.01) |

(52) U.S. Cl.
CPC .................. *F42B 3/04* (2013.01); *B64D 1/02* (2013.01); *F42B 3/10* (2013.01); *F42C 19/12* (2013.01)

(58) Field of Classification Search
CPC ..... F42B 3/04; F42B 3/10; B64D 1/02; F42C 19/12
USPC ............................... 89/1.51, 1.54, 1.56, 1.57
See application file for complete search history.

(56) References Cited

U.S. PATENT DOCUMENTS

| | | | | |
|---|---|---|---|---|
| 5,029,776 A | * | 7/1991 | Jakubowski | B64D 1/06 244/137.4 |
| 5,070,760 A | * | 12/1991 | Marshall | B64D 1/04 89/1.51 |
| 5,487,322 A | * | 1/1996 | Rhodes | B64D 1/04 244/137.4 |
| 5,583,312 A | * | 12/1996 | Jakubowski, Jr. | B64D 1/06 244/137.4 |
| 6,892,985 B2 | * | 5/2005 | Jakubowski, Jr. | B64D 1/02 244/137.4 |

(Continued)

*Primary Examiner* — Bret Hayes
(74) *Attorney, Agent, or Firm* — AFMCLO/JAZ; David E. Franklin

(57) ABSTRACT

A selectable force gas generator (SFGG) includes support material of honeycomb structure and a gas collection chamber contained in a housing. Gas-generating propellant cells are partially embedded in the support material. Each of the gas-generating propellant cells includes a steel jacket having a convex portion exposed to the gas collection chamber. The steel jacket has an orifice through the convex portion. Each propellant cell includes a propellant packet contained in the jacket. Each propellant cell includes a fire wire electrically connectable to an electrically-fired initiator and electrically connected to the propellant packet. The fire wire transmits a firing signal that causes the propellant packet to produce gas. A cap is positioned between the propellant packet and the jacket. The cap has a tip that blocks the orifice of the jacket and the thickness of the jacket is sufficient to prevent sympathetic detonation of the propellant packet.

5 Claims, 7 Drawing Sheets

(56) References Cited

U.S. PATENT DOCUMENTS

| | | | |
|---|---|---|---|
| 7,954,765 B2 * | 6/2011 | Jakubowski, Jr. ....... | B64D 1/04 244/137.4 |
| 8,127,656 B1 * | 3/2012 | Yuan ........................ | B64D 1/06 89/1.54 |
| 10,710,721 B2 * | 7/2020 | Provenza ................. | B64D 1/04 |
| 2004/0016848 A1 * | 1/2004 | Jakubowski, Jr. ........ | F41B 7/00 244/137.4 |
| 2013/0047835 A1 * | 2/2013 | Tobias .................... | B64D 1/06 92/61 |

* cited by examiner

SELECTABLE FORCE GAS GENERATOR

This application is a continuation-in-part patent application to co-pending and commonly owned U.S. patent application Ser. No. 16/190,740 entitled "Airborne Store Ejection Using Selectable Force Gas Generator" filed 14 Nov. 2018, which in turn claims the benefit to U.S. Provisional Application Ser. No. 62/724,325 entitled "Airborne Store Ejection Using Selectable Force Gas Generator", filed 29 Sep. 2018, the content of both of which are incorporated herein by reference in their entirety. This application claims the benefit of U.S. Provisional Application Ser. No. 62/892,912 entitled "Selectable Force Gas Generator" filed 28 Aug. 2019, the disclosure of which is hereby incorporated by reference in its entirety.

ORIGIN OF THE INVENTION

The invention described herein was made by employees of the United States Government and may be manufactured and used by or for the Government of the United States of America for governmental purposes without the payment of any royalties thereon or therefore.

BACKGROUND

1. Technical Field

The present disclosure generally relates to gas generating charges, and more particularly to electrically-initiated gas-generating charges.

2. Description of the Related Art

Conventional bomb rack systems have a preset ejection force that can only be selected manually on the ground and prior to flight. Rapid changes in speed, attitude, pitch attitude, pitch rate, sensed gravitational forces, etc., however, can cause a weapon ejected with a preset ejection force to have insufficient separation from the aircraft or to tumble. This restricts the delivering aircraft to a limited operational envelope wherein the preset ejection force achieves an effective delivery of the weapon. In addition, conventional bomb rack system are costly, heavy and reusable which require regular inspections and maintenance. In addition, they are subject to fatigue, material corrosion, and other long term effects.

BRIEF SUMMARY

According to aspects of the present disclosure, a selectable force gas generator (SFGG) includes support material of honeycomb structure and a gas collection chamber contained in a housing. Gas-generating propellant cells are partially embedded in the support material. Each of the gas-generating propellant cells includes a steel jacket having a convex portion exposed to the gas collection chamber with thickness sufficient to withstand increased outer pressure from initiation of another gas-generating propellant cell. The steel jacket has an orifice through the convex portion. Each propellant cell includes a propellant packet contained in the jacket. Each propellant cell includes a fire wire electrically connectable to an electrically-fired initiator and electrically connected to the propellant packet. The fire wire transmits a firing signal that causes the propellant packet to produce gas. A cap is positioned between the propellant packet and the jacket. The cap has a tip that blocks the orifice of the jacket and the thickness of the jacket is sufficient to withstand rom increased outer pressure in the gas collection chamber to prevent sympathetic detonation of the propellant packet.

According to aspects of the present disclosure, an airborne support assembly is provided that includes a first ejector housing assembly coupled to a selected one of: (i) an airborne store; and (i) an aircraft. A first fluid-actuated ejector piston is received for movement in the first ejector housing assembly. The first fluid-actuated ejector piston has a distal end abutting for contact the other one of: (i) the airborne store; and (ii) the aircraft. The airborne support assembly includes a first selectable force gas generator (SFGG) comprising a SFGG housing coupled to the first ejector housing assembly. The SFGG housing contains a gas collection chamber that is in fluid communication with the first fluid-actuated ejector piston. The SFGG includes support material contained in the housing adjacent to the gas collection chamber. The SFGG incudes more than one gas-generating propellant cells partially embedded in the support material. Each of the more than one gas-generating propellant cells comprises (i) a jacket of material having a convex portion exposed to the gas collection chamber, having a thickness sufficient to withstand increased outer pressure from initiation of another gas-generating propellant cell, and including an orifice through the convex portion; (ii) a propellant packet contained in the jacket; (iii) a fire wire electrically connected to the propellant packet, the fire wire transmitting a firing signal that causes the propellant packet to produce gas, and (iv) a cap positioned between the propellant packet and the jacket and having a tip that blocks the orifice of the jacket from increased outer pressure in the gas collection chamber to prevent sympathetic detonation of the propellant packet. The airborne support assembly includes an initiator in electrical communication with the first SFGG and that supplies at least one firing signal that causes a first selected subset of the more than one gas-generating unit that corresponds to the first selected amount of force. The airborne support assembly includes a first signal switching matrix that selectively communicatively couples the firing signal from the initiator to one or more of the gas-generating units via respective fire wires to actuate the first fluid-actuated ejector piston with a first selected amount of force to eject the airborne store.

According to aspects of the present disclosure, a method is provided for making a SFGG. In one or more embodiments, the method includes forming more than one jacket having convex portion with an orifice. The method includes, for each jacket, assembling a propellant packet with a cap on one end and a fire wire attached to another end. The method includes inserting the assembled propellant packet with the cap into each respective jacket through an opening with the fire wire extending out of the opening in the jacket. The method includes positioning a tip of the cap to block the orifice in the convex portion of the respective jacket. The method includes sealing the opening in each respective jacket to direct gas generated by the propellant packet toward the cap and the orifice to produce more than one gas-generating propellant cell. The method includes positioning a portion of the more than one gas-generating propellant cells in support material with the convex portions exposed. The method includes inserting the support material and the more than one gas-generating propellant cells in a housing that has a gas collection chamber.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
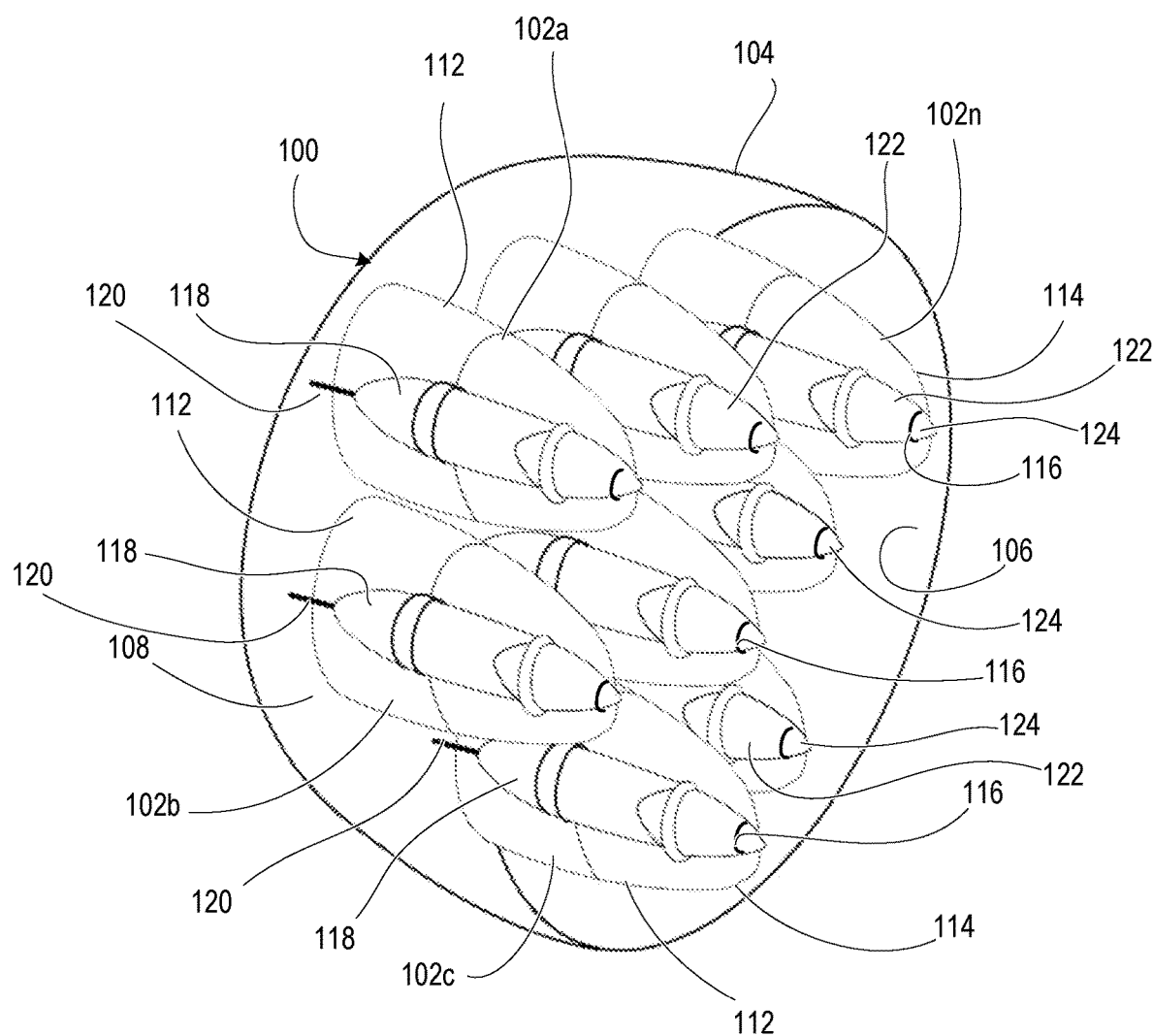
FIG. 1 is perspective view of a selectable force gas generator (SFGG) that enables selecting a pattern of firing of gas generating propellant shells for a desired peak and duration of gas pressure, according to one or more embodiments.

According to aspects of the present disclosure,

The SFGG is an enabling capability for an airborne store support assembly that includes a fluid-actuated ejector piston position a supported airborne store relative to an aircraft and is received for movement in an ejector housing assembly. A selectable force gas generator (SFGG) includes a total number of more than one gas-generating unit in fluid communication with a first ejector housing assembly to actuate the fluid-actuated ejector piston with a selected amount of force. An initiator is in communication with the SFGG and supplies at least one firing signal that causes a selected subset of the more than one gas-generating unit. A first signal switching matrix selectively communicatively couples a firing signal from the initiator to one or more of the gas-generating units. The selected subset corresponds to the selected amount of force that is dynamically determined by a controller based on flight parameters of at least one of an attitude, a rate of motion, and a rate of acceleration of the aircraft.

In one aspect, the present disclosure provides an airborne store support assembly that includes a first ejector housing assembly having a mechanical interface attachable to an aircraft. A first fluid-actuated ejector piston is received for movement in the first ejector housing assembly. The first fluid-actuated ejector piston has a airborne store support structure to position a supported airborne store relative to the aircraft. A first SFGG includes a total number of more than one gas-generating unit in fluid communication with the first ejector housing assembly. The SFGG actuates the first fluid-actuated ejector piston with a first selected amount of force. A first electrical interface is in communication with the first SFGG. The first electrical interface supplies at least one firing signal that causes a first selected subset of the more than one gas-generating unit that corresponds to the first selected amount of force. A communication interface coupled to at least one sensor that dynamically detects one or more flight parameters of at least one of: (i) an attitude; (ii) a rate of motion; and (iii) a rate of acceleration of the aircraft. A controller is in communication with the first electrical interface and the communication interface. The controller dynamically determines the first selected subset of the more than one gas-generating unit based at least in part on the one or more flight parameters.

In another aspect, the present disclosure provides a SFGG comprising (i) a plurality of gas-generating propellant cells; (ii) an SFGG housing attachable to an ejector housing of an airborne store support assembly of an aircraft; (iii) a honeycombed lattice structure contained by the SFGG housing that maintain the plurality of electrically-fired initiators in operable contact with the plurality of gas-generating propellant cells; (iv) one or pneumatic conduit that originate with each one of the plurality of gas-generating propellant cells and form a converged output conduit connectable for fluid communication with the respective ejector housing; and (v) a first signal switching matrix that selectively communicatively couples the firing signal from the initiator to one or more of the gas-generating units.

In another aspect, the present disclosure provides a method for dynamically providing an amount of force to ejecting an airborne store from an aircraft. The method includes dynamically detecting one or more flight parameters of at least one of: (i) an attitude; (ii) a rate of motion; and (iii) a rate of acceleration of an aircraft. In response to receiving at least one firing signal, the method includes: (i) determining a first selected amount of force required at a first fluid-actuated ejector piston, received for movement in a first ejector housing, to separate an airborne store from the aircraft during release that compensates for the dynamically detected one or more flight parameters; and (ii) initiating a first selected subset that correspond to the first selected amount of force of a number of gas-generating units of a first selectable force gas generator (SFGG). The initiated first selected subset of gas-generating units actuates the first fluid-actuated ejector piston to cause a separation between the airborne store and the aircraft.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

FIG. 1 is perspective view of a selectable force gas generator (SFGG) 100 that enables selecting a pattern of firing of gas generating propellant shells 102 $a$ 102$n$ for a desired peak and duration of gas pressure. A housing 104 is attachable to an ejector mechanism of an airborne store support assembly of an aircraft (not shown). The housing 104 contains a gas collection chamber 106. Honeycomb structure 108 provides support material that is contained in the housing 104 adjacent to the gas collection chamber 106. Gas-generating propellant cells 102$a$ 102$n$ are partially embedded in the honeycomb structure 108. Honeycomb structure 108 provides a light weight option for airborne applications, although other support materials may be used.

Each gas-generating propellant cell 102 $a$ 102$n$ includes a steel jacket 112 having a convex portion 114 exposed to the gas collection chamber 106. The steel jacket 112 has a thickness sufficient to withstand increased outer pressure from initiation of another gas-generating propellant cell 102 $a$ 102$n$. Steel is an example of a strong material that resists sympathetic detonation but other materials may be used according to aspects of the present disclosure. The steel jacket 112 includes an orifice 116 through the convex portion 114. A propellant packet 118 is contained in the steel jacket 112. A fire wire 120 is electrically connectable to an electrically-fired initiator (not shown). The fire wire 120 is electrically connected to the propellant packet 118. The fire wire 120 transmits a firing signal that causes the propellant packet 118 to rapidly produce gas. A cap 122 is positioned between the propellant packet 118 and the steel jacket 112. The cap 122 has a tip 124 that blocks the orifice 116 of the steel jacket 112 from increased outer pressure in the gas collection chamber 106 to prevent sympathetic detonation of the propellant packet 118.

Figure 2:
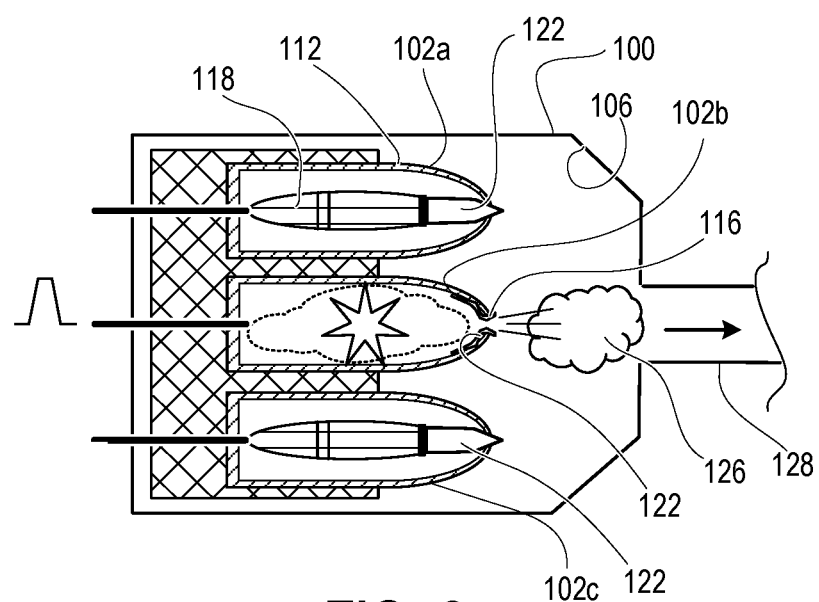
FIG. 2 is a simplified diagrammatic view of the SFGG of FIG. 1 with one gas generator firing without sympathetic firing by two unfired gas generators, according to one or more embodiments.
Figure 3:
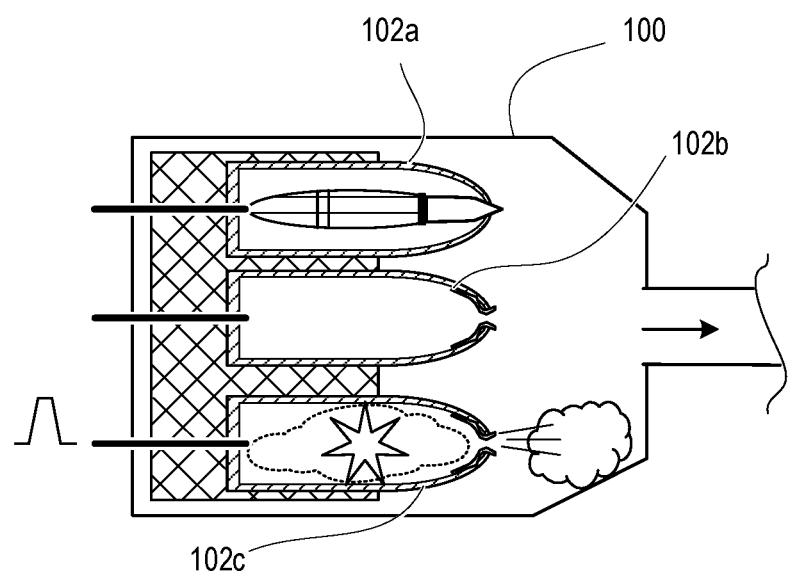
FIG. 3 is a simplified diagrammatic view of the SFGG of FIG. 2 with a second gas generator firing without sympathetic firing by the remaining unfired gas generator, according to one or more embodiments.

FIG. 2 depicts the SFGG 100 having gas-generating propellant cell 102 $a$ 102$c$ with one gas-generating propellant cell 102$b$ firing. Cap 122 is ruptured and/or orifice 116 is expanded by increased gas pressure internal to steel jacket 112, allowing gas 126 to enter gas collection chamber 106 and to be guided by gas conduit 128 to an ejection mechanism (not shown). Adjacent gas-generating propellant cells 102 $a$, 102$c$ do not fire due to sympathetic detonation. FIG. 3 depicts the SFGG 100 with gas-generating propellant cell 102$b$ fully expended. Gas-generating propellant cell 102$c$ is firing without causing sympathetic detonation of gas-generating propellant cell 102$a$.

Figure 4:
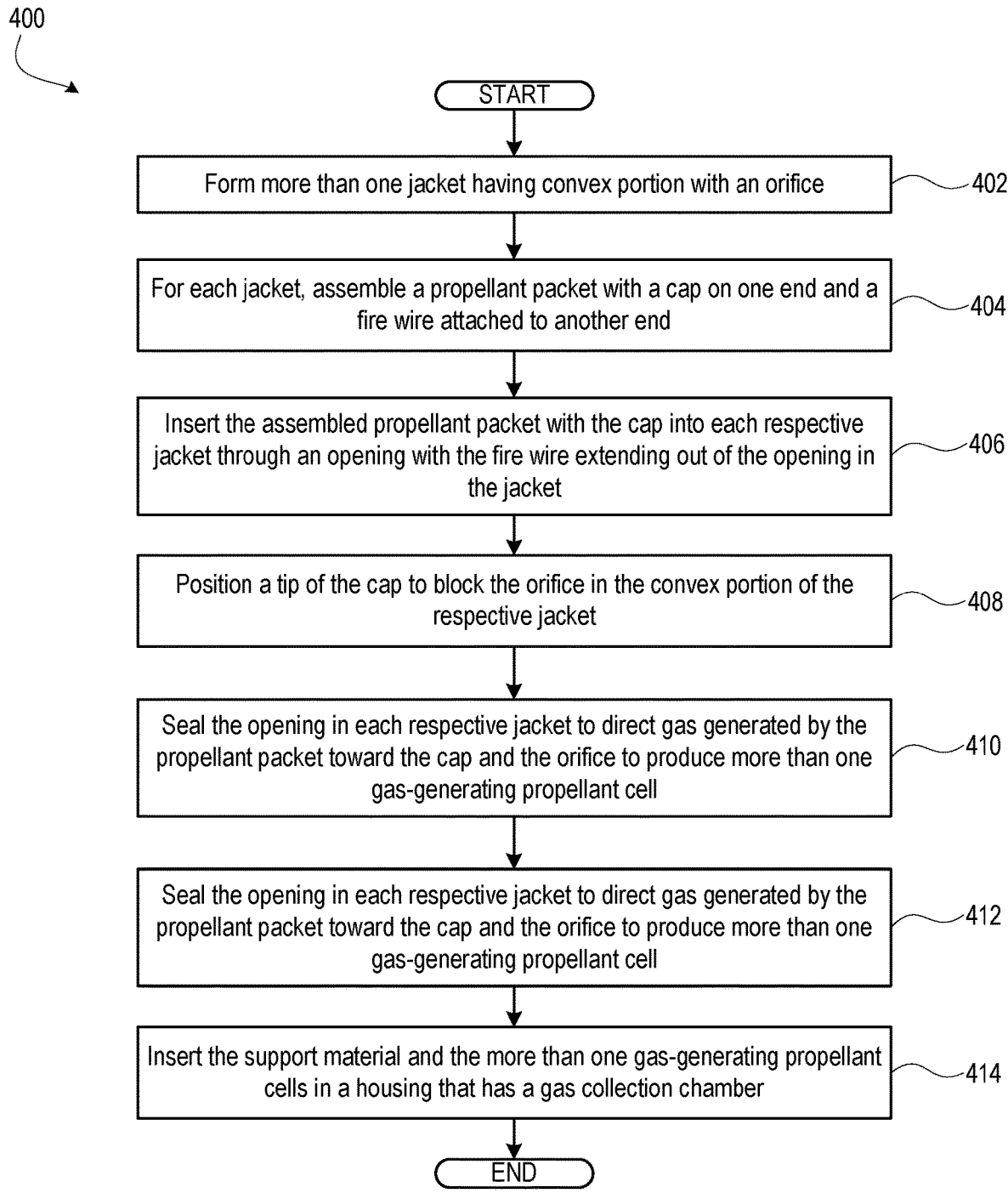
FIG. 4 is a flow diagram of making a SFGG, according to one or more embodiments.

FIG. 4 depicts a flow diagram of a method 400 for making a SFGG. In one or more embodiments, the method 400 includes forming more than one jacket having convex portion with an orifice (block 402). The method 400 includes, for each jacket, assembling a propellant packet with a cap on one end and a fire wire attached to another end (block 404). The method 400 includes inserting the assembled propellant packet with the cap into each respective jacket through an opening with the fire wire extending out of the opening in the jacket (block 406). The method 400 includes positioning a tip of the cap to block the orifice in the convex portion of the respective jacket (block 408). The method 400 includes sealing the opening in each respective jacket to direct gas generated by the propellant packet toward the cap and the orifice to produce more than one gas-generating propellant cell (block 410). The method 400 includes positioning a portion of the more than one gas-generating propellant cells in support material with the convex portions exposed (block 412). The method 400 includes inserting the support material and the more than one gas-generating propellant cells in a housing that has a gas collection chamber (block 414). Then method 400 ends.

Figure 5:
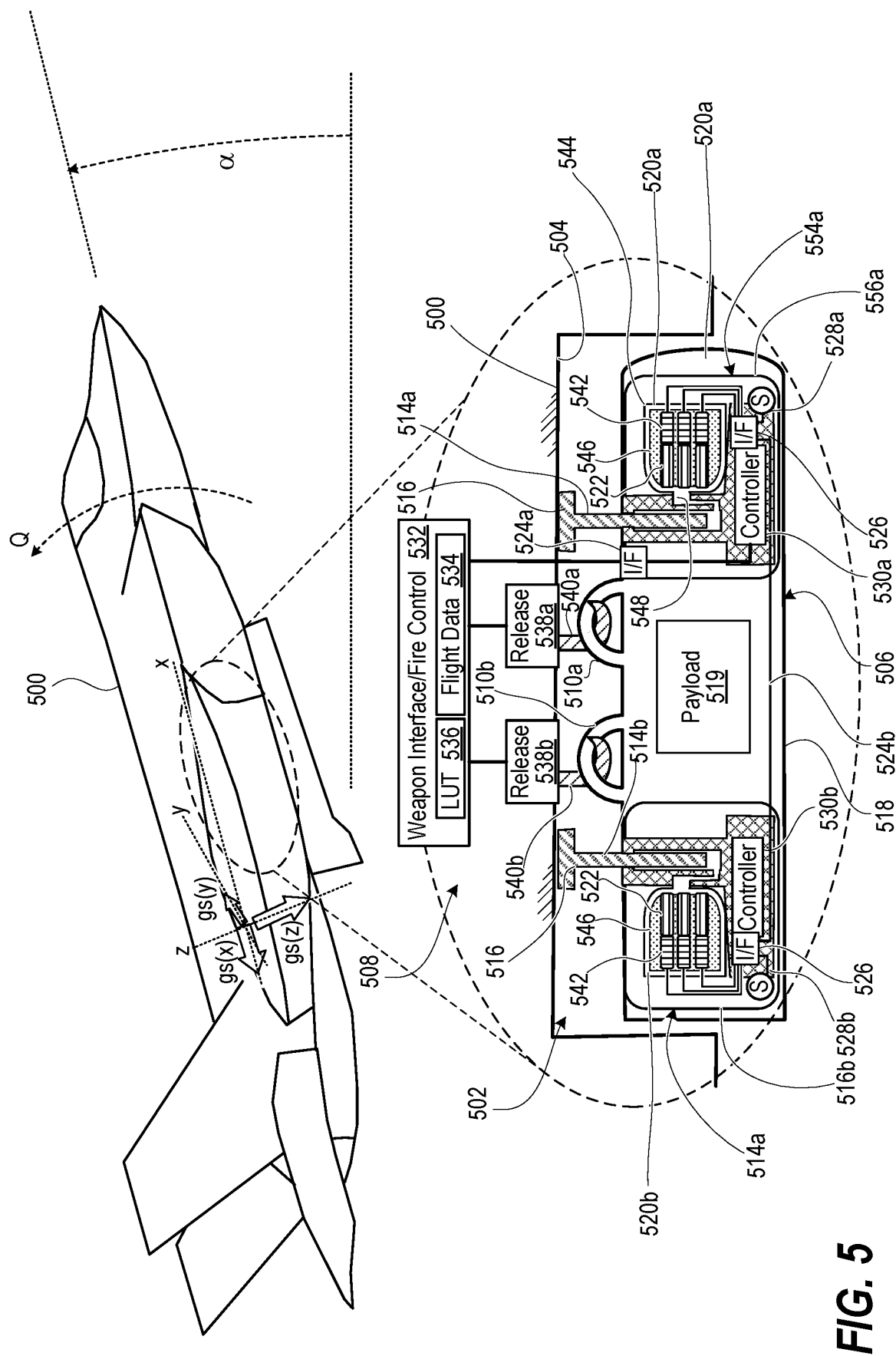
FIG. 5 is a side view of an aircraft annotated with flight parameters and with a detailed simplified functional diagram of an airborne store ejection system, according to one or more embodiments.
Figure 6:
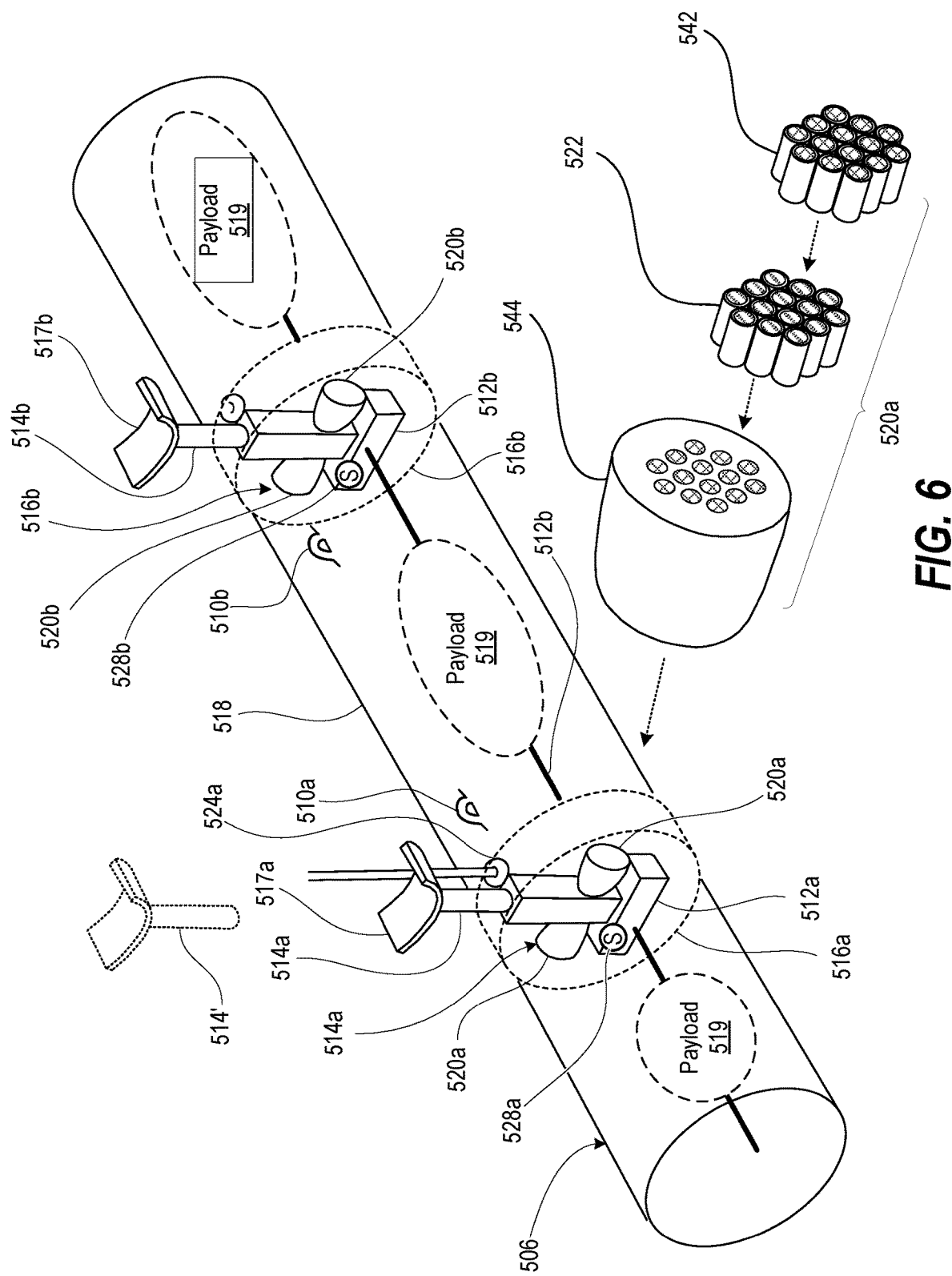
FIG. 6 is an isometric diagrammatic view of airborne store, according to one or more embodiments.

FIG. 5 is a side view of aircraft 100 annotated with flight parameters and with a detailed simplified functional diagram of airborne store ejection system 502, according to one or more embodiments. FIG. 6 is an isometric diagrammatic view of airborne store 506. With particular reference to FIG. 5S, aircraft 500 has airframe 504 that is subject to aerodynamic movements comprising changes in attitude, rate of motion and rate of acceleration. The aerodynamic movements are represented by (i) sensed gravitational acceleration along aircraft body longitudinal x-axis (gs(x)); (ii) sensed gravitational acceleration along aircraft body lateral y-axis (gs(y)); (iii) sensed gravitational acceleration along aircraft body vertical z-axis (gs(z)); (v) pitch rate (Q); and (vi) angle of attack (a). Other flight parameters that can affect airborne store deployment can include, but are not limited to: (vii) static temperature (TO); (viii) total temperature; (ix) altitude; (x) flight path angle (y); (xi) barometric pressure; (xii) wind speed; (xiii) wind direction; (xiv) velocity; (xv) pitching moment (M); (xvi) rolling moment (L); (xvii) yawing moment (N); (xviii) local horizon reference plane; (xix) pitch attitude ($\theta$); (xx) roll attitude ($\phi$); (xxi) yaw rate (r); and (xxii) angle sideslip ($\beta$).

An airborne store 506 is suspended from the airframe 504 of the aircraft 500 by a store suspension and delivery system (SSDS) 508 that can include: (i) components integral to the airborne store 506; (ii) components integral to the aircraft 500; and (ii) airborne store support components mountable or engageable between the aircraft 500 and airborne store 506. For example, airborne store 506 can include fore and aft suspension lugs 510a, 510b, one or more communication interfaces 512a, 512b, and fore and aft airborne store ejection subsystems 514a, 514b. Each airborne store ejection subsystem 514a, 514b includes an ejector bulkhead 516a, 516b that provides structural attachment to a cylinder wall 518 of the airborne store 506 as well as an internal support structures (not shown).

Airborne store 506 can be various types of payloads 519 that are carried externally or within a weapons bay of an aircraft that require the ability to be released during flight without contacting the aircraft 500. Release or firing can be operationally required, such as releasing a munition or airborne deployable payload. Release can be performed in response to needing to reduce aerodynamic drag, such as dropping fuel tanks in preparation for air-to-air combat or an emergency landing. Examples of munitions include canisters that dispense bomblets, flare parachutes, etc. Munitions include torpedoes, bombs, rockets, missiles, reconnaissance drones, target drones, etc. Airborne stores can contain emergency supplies for ground personnel. In one or more embodiments, airborne store 506 has an aerodynamic shape to depart ballistically from the aircraft 500 after release and ejection. SSDS 508 imparts ejection force(s) that separate the airborne store 506 from the aircraft 500 with stabilized motions and accelerations relative to the aircraft 500 to avoid tumbling or impact after release.

Airborne store support assembly 502 includes first and second ejector bulkheads 510a, 510b. For example, first ejector bulkhead 510a can be oriented longitudinally in front of second ejector bulkhead 510b. First ejector bulkhead 510a includes first ejector housing assembly 512a. First fluid-actuated ejector piston 514a is received for movement in first ejector housing assembly 512a. In one or more embodiment, first fluid-actuated ejector piston 514a terminates with contact structure 517a to push against another structure to position supported airborne store 506 relative to aircraft 500. First SFGG 520a includes a total number of more than one gas-generating unit 522 in fluid communication with first ejector housing assembly 512a. First SFGG 520a actuates the first fluid-actuated ejector piston 514a with a first selected amount of force. First communication interface 524a is in communication with the second SFGG 520a. First communication interface 524a supplies at least one firing signal generated by an initiator 525a that causes a second selected subset of the more than one gas-generating unit 522 that corresponds to the second selected amount of force. Device interface 526a is coupled to at least one sensor 528a that dynamically detects one or more flight parameters of at least one of: (i) an attitude; (ii) a rate of motion; and (iii) a rate of acceleration of the aircraft. A controller 530a is in communication with the second communication interface 524a and the device interface 526a. The controller 530a dynamically determines the second selected subset of the more than one gas-generating unit 522 based at least in part on the one or more flight parameters.

Similarly, second ejector bulkhead 510b includes second ejector housing assembly 512b. Second fluid-actuated ejector piston 514b is received for movement in second ejector housing assembly 512b. In one or more embodiment, second fluid-actuated ejector piston 514b terminates with contact structure 517b to push against another structure to position supported airborne store 506 relative to aircraft 500. Second SFGG 520b includes a total number of more than one gas-generating unit 522 in fluid communication with second ejector housing assembly 512b. Second SFGG 520a actuates the second fluid-actuated ejector piston 514b with a second selected amount of force. Second communication interface 524b is in communication with the second SFGG 520b. The second communication interface 524b supplies at least one firing signal generated by an initiator 525b that causes a second selected subset of the more than one gas-generating unit 522 that corresponds to the second selected amount of force. Device interface 526b is coupled to at least one sensor 528b that dynamically detects one or more flight parameters of at least one of: (i) an attitude; (ii) a rate of motion; and (iii) a rate of acceleration of the aircraft. A controller 530b is in communication with the second communication interface 524b, such as an intra-store communication bus, and the device interface 526b. The controller 530b dynamically determines the second selected subset of the more than one gas-generating unit 522 based at least in part on the one or more flight parameters.

For clarity, release and ejection and other functionality of the SSDS 508 is distributed between higher level functions performed by a weapon interface/fire control system 532 of aircraft 500 and one or more controllers 530a, 530b that control SFGGs 520a, 520b. For example, weapon interface/fire control system 532 can confirm that release is occurring before triggering ejection, instructing controllers 530a, 530b as to what respective motion profile is to be executed. In an exemplary embodiment, weapon interface/fire control system 532 maintains flight data 534 that is used to find appropriate motion profiles in a lookup table (LUT) 536. In one or more embodiments, controllers 530a, 530b are responsible for determining what motion profile is appropriate based on locally sensed flight data and settings specific for a type of airborne store 506 that is being carried. In one or more embodiments, the illustrative functions discussed herein are performed by a unified controller. Weapon interface/fire control system 532 actuate release mechanisms 538a, 538b that unlatch respective support hooks 540a, 540b from each lug 510a, 510b, allowing separation of airborne store 506 from aircraft 500.

In another aspect, SFGG 520a, 520b can provide a replaceable assembly of (i) a plurality of gas-generating propellant cells 522; (ii) a signal switching matrix 542 that can be dynamically programmed to selectably trigger one or more gas-generating propellant cells 522; (ii) an SFGG housing 544 attachable to a respective ejector housing assembly 512a, 512b; (iii) a honeycombed lattice structure 546 contained by the SFGG housing 544 that maintain the signal switching matrix 542 in operable contact with the plurality of gas-generating propellant cells 522; (iv) one or pneumatic conduits 548 that originate with each one of the plurality of gas-generating propellant cells 522.

FIG. 6 illustrates that each airborne store ejection subsystem 514a, 514b can have more than one SFGG 520a, 520b, such as to provide greater amounts of selectable gas or to provide redundancy. In one or more embodiments, ejection pistons 514a, 514b and contact structures 517a, 517b can remain with aircraft 500 as released ejection piston 514' with respective ejection housing assemblies 512a, 512b pushing away from ejection pistons 514a, 514b.

Figure 7:
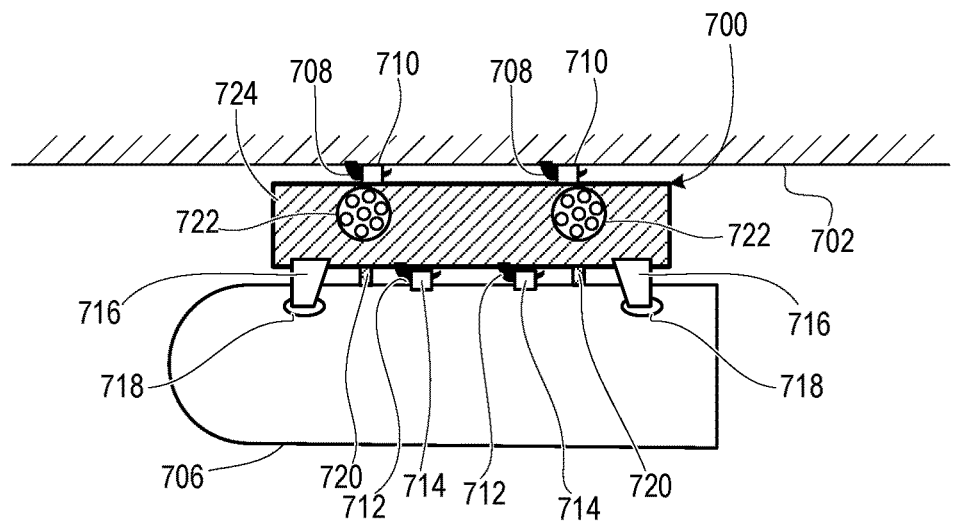
FIG. 7 is a side view of a bomb rack attached between an aircraft and a suspended airborne store, according to one or more embodiments.

FIG. 7 is a side view of a bomb rack 700 attached between an aircraft 702 and a suspended airborne store 706. Aircraft 702 include an aircraft suspension apparatus 708 engageably attached to lugs 710 on bomb rack 700. Bomb rack 700 in turn include a suspension apparatus 712 engageably attached to lugs 714 on airborne store 706. Bomb rack 700 includes sway braces 716 having sway pads 718 that contact and steady airborne store 706. Ejector pistons 720 extend downward from bomb rack 700 to contact airborne store 706. SFGGs 722 are mounted to rack frame 724 of bomb rack 700 to generate a selected amount of force to eject airborne store 706 away from bomb rack 700 and aircraft 702 to achieve separation.

Figure 8:
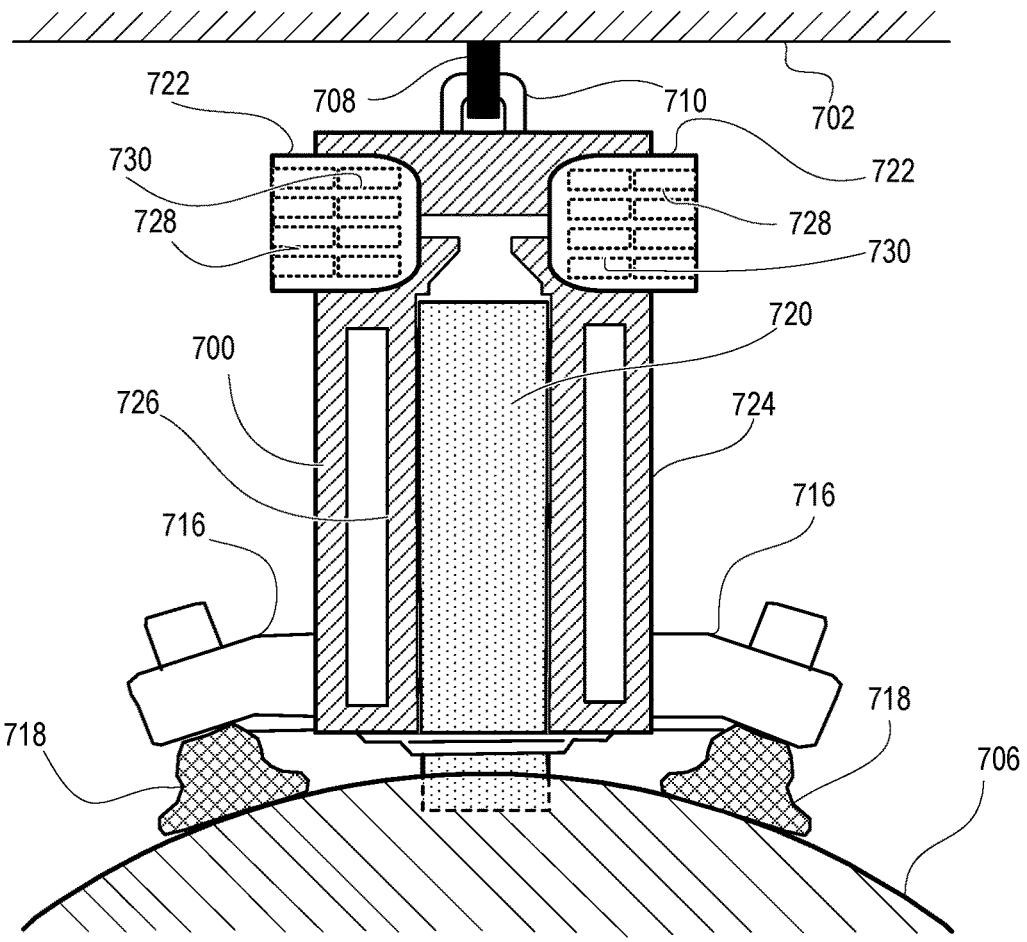
FIG. 8 is a front cross-sectional view of the bomb rack attached between aircraft and suspended airborne store, according to one or more embodiments.

FIG. 8 is a front cross-sectional view of bomb rack 700 attached between aircraft 702 and suspended airborne store 706. Ejector piston 720 is received upward into ejection housing 726 of rack frame 724. SFGGs 722 include signal switching matrix 742 in operable contact with the plurality of gas-generating propellant cells 730 that generate gas that pressurizes a piston chamber 732 to downwardly extend ejector piston 720 to eject airborne store 706.

In one or more embodiments, bomb rack 700 is a missionized assembly that is mounted onto aircraft 702 as required. In one or more embodiments, bomb rack 700 is one of a number of types of bomb racks and other store support adapters that can be selected for mounting. In one or more embodiments, a rack frame is integral to, or otherwise attached to, a structural frame of aircraft 702.

Figure 9:
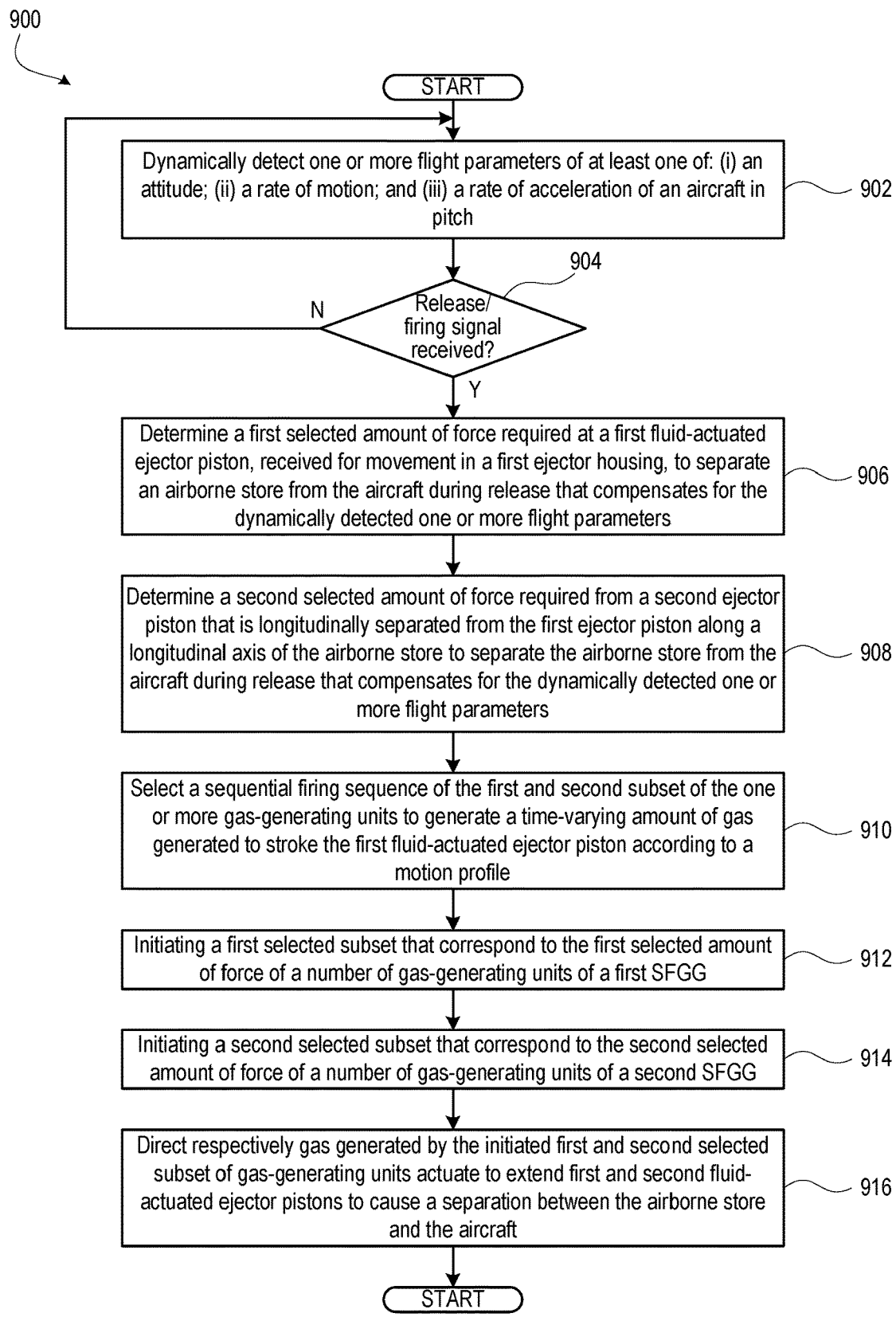
FIG. 9 is a flow diagram of a method for dynamically providing an amount of force to ejecting an airborne store from an aircraft, according to one or more embodiments

FIG. 9 is a flow diagram of a method 900 for dynamically providing an amount of force to ejecting an airborne store from an aircraft. In one or more embodiments, method 900 includes dynamically detecting one or more flight parameters of at least one of: (i) an attitude; (ii) a rate of motion; and (iii) a rate of acceleration of an aircraft in pitch (block 902). In one or more embodiment, the one or more flight parameters can include: (i) sensed gravitational acceleration along aircraft body longitudinal x-axis (gs(x)); (ii) sensed gravitational acceleration along aircraft body lateral y-axis (gs(y)); (iii) sensed gravitational acceleration along aircraft body vertical z-axis (gs(z)); (iv) static temperature (TO); (v) pitch rate (Q); and (vi) angle of attack.

A determination is made as to whether a release or firing signal is received (decision block 904). In one or more embodiments, successful release can be a condition precedent for triggering ejection. In response to determining that a release or firing signal is not received, method 900 returns to block 902 to continue monitoring flight parameters. In response to determining that a release or firing signal is received, method 900 includes determining a first selected amount of force required at a first fluid-actuated ejector piston, received for movement in a first ejector housing, to separate an airborne store from the aircraft during release that compensates for the dynamically detected one or more flight parameters (block 906). In one or more embodiments, method 900 includes determining a second selected amount of force required from a second ejector piston that is longitudinally separated from the first ejector piston along a longitudinal axis of the airborne store to separate the airborne store from the aircraft during release that compensates for the dynamically detected one or more flight parameters (block 908). In one or more embodiments, method 900 includes determining the first selected amount of force by accessing a lookup table (LUT) containing a plurality of first selected subsets associated with respective values of the one or more flight parameters. In certain instances, the first and second subsets are different to longitudinally compensate in pitch for the one or more flight parameters.

In one or more embodiments, method 900 includes selecting a sequential firing sequence of the first and second subset of the one or more gas-generating units to generate a time-varying amount of gas generated to stroke the first fluid-actuated ejector piston according to a motion profile (block 910). The motion profile can be based on the first selected amount of force such as to maintain a selected rate of acceleration of the first and second fluid-actuated ejector piston. The motion profile can also be selected to remain within a mechanical pressure limit as the piston is displaced.

Method 900 includes initiating a first selected subset that correspond to the first selected amount of force of a number of gas-generating units of a first SFGG (block 912). Method 900 includes initiating a second selected subset that correspond to the second selected amount of force of a number of gas-generating units of a second SFGG (block 914). Method 900 includes directing respectively gas generated by the initiated first and second selected subset of gas-generating units actuate to extend first and second fluid-actuated ejector pistons to cause a separation between the airborne store and the aircraft (block 916). Then method 900 ends.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A selectable force gas generator (SFGG) comprising:
 a housing attachable to an ejector mechanism of an airborne store support assembly of an aircraft and containing a gas collection chamber;
 support material contained in the housing adjacent to the gas collection chamber; and
 more than one gas-generating propellant cells partially embedded in the support material, each of the more than one gas-generating propellant cells comprising:
  a jacket of material having a convex portion exposed to the gas collection chamber, having a thickness sufficient to withstand increased outer pressure from initiation of another gas-generating propellant cell, and including an orifice through the convex portion,
  a propellant packet contained in the jacket;
  a fire wire electrically connectable to an electrically-fired initiator and electrically connected to the propellant packet, the fire wire transmitting a firing signal that causes the propellant packet to produce gas, and a cap positioned between the propellant packet and the jacket and having a tip that blocks the orifice of the jacket from increased outer pressure in the gas collection chamber to prevent sympathetic detonation of the propellant packet.

2. The SFGG of claim 1, wherein the support material is a honeycomb structure.

3. The SFGG of claim 1, wherein the jacket of material comprises a steel jacket.

4. An airborne support assembly comprising:
a first ejector housing assembly coupled to a selected one of: (i) an airborne store; and (i) an aircraft;
a first fluid-actuated ejector piston received for movement in the first ejector housing assembly and having a distal end abutting for contact the other one of: (i) the airborne store; and (ii) the aircraft;
a first selectable force gas generator (SFGG) comprising:
a SFGG housing coupled to the first ejector housing assembly and containing a gas collection chamber that is in fluid communication with the first fluid-actuated ejector piston;
support material contained in the housing adjacent to the gas collection chamber; and
more than one gas-generating propellant cells partially embedded in the support material, each of the more than one gas-generating propellant cells comprising:
a jacket of material having a convex portion exposed to the gas collection chamber, having a thickness sufficient to withstand increased outer pressure from initiation of another gas-generating propellant cell, and including an orifice through the convex portion,
a propellant packet contained in the jacket;
a fire wire electrically connected to the propellant packet, the fire wire transmitting a firing signal that causes the propellant packet to produce gas, and a cap positioned between the propellant packet and the jacket and having a tip that blocks the orifice of the jacket from increased outer pressure in the gas collection chamber to prevent sympathetic detonation of the propellant packet;

an initiator in electrical communication with the first SFGG and that supplies at least one firing signal that causes a first selected subset of the more than one gas-generating unit that corresponds to the first selected amount of force; and a first signal switching matrix that selectively communicatively couples the firing signal from the initiator to one or more of the gas-generating units via respective fire wires to actuate the first fluid-actuated ejector piston with a first selected amount of force to eject the airborne store.

5. A method comprising:
forming more than one jacket having convex portion with an orifice;
for each jacket, assembling a propellant packet with a cap on one end and a fire wire attached to another end;
inserting the assembled propellant packet with the cap into each respective jacket through an opening with the fire wire extending out of the opening in the jacket;
positioning a tip of the cap to block the orifice in the convex portion of the respective jacket;
sealing the opening in each respective jacket to direct gas generated by the propellant packet toward the cap and the orifice to produce more than one gas-generating propellant cells;
positioning a portion of the more than one gas-generating propellant cells in support material with the convex portions exposed;
inserting the support material and the more than one gas-generating propellant cells in a housing that has a gas collection chamber.

* * * * *